Figure 1:
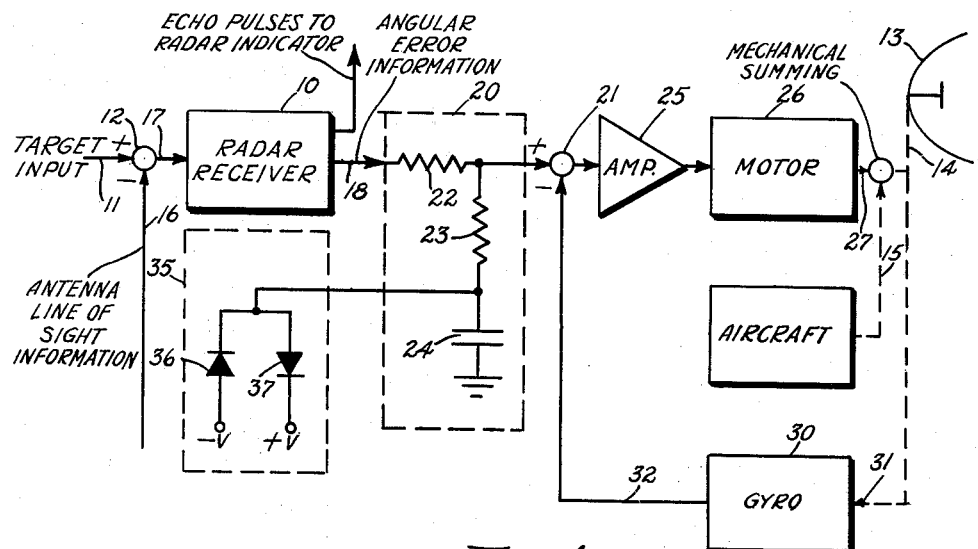

Dec. 8, 1964  R. H. AIRES  3,160,880
VELOCITY SATURATION CONTROL FOR TRACK NETWORKS
Filed Oct. 14, 1959

INVENTOR.
RAMON H. AIRES
BY
*H. H. Luck*
ATTORNEYS 3,160,880
VELOCITY SATURATION CONTROL FOR TRACK NETWORKS
Ramon H. Aires, Levittown, Pa., assignor, by mesne assignments, to the United States of America as represented by the Secretary of the Navy
Filed Oct. 14, 1959, Ser. No. 846,516
2 Claims. (Cl. 343—7.4)

This invention relates to radar antenna tracking loops and more particularly to a means for controlling the voltage amplitude of target tracking signals to eliminate unrealistic voltages superimposed thereon in radar target antenna tracking loops which would normally cause saturation of tracking loop components nullifying realistic signal control.

In known radar systems, in which a tracking loop is used between a radar receiver and an antenna means to provide command rate tracking signals through a servo motor tracking loop to actuate the antenna in azimuth and elevation to track a target, the target input signal is combined with the antenna position signal to develop an error signal for driving the servo motor to position the antenna. These tracking loops, in general, utilize the target signal in the radar receiver to provide target position intelligence which is amplified in a servo amplifier and applied to a servo motor mechanically coupled to the antenna actuating mechanism to maintain the antenna in a direction focussed on the target at all times. Antenna position information is fed back to the radar receiver to develop the error voltages indicative of the relative position of the antenna beam and the target for driving the servo amplifier and servo motor. These loops are also usually supplied with a stabilization loop wherein a rate gyroscope is used in an electro-mechanical feedback from the radar antenna to the servo amplifier to develop a voltage proportional to the driving rate or velocity of the servo motor and antenna which voltage is summed with the error voltage for stabilizing the servo motor amplifier control system against antenna hunting. While such radar antenna tracking loops have been widely used and are substantially successful in operation, such loops have the disadvantage that any spurious target input voltage or any other unrealistic voltage intelligence resulting from sudden blocking and unblocking of the radar receiver or from pitch, roll, and yaw motions of the aircraft or other conveyance in which such devices may be used, will cause saturation of the servo amplifier, the servo motor, and/or the rate gyroscope during the existance of the unrealistic voltage signal, to place the tracking loop completely out of control. The further disadvantage results in that considerable time is consumed after the unrealistic signal voltage has ceased for the tracking loop to recover to the normal operating condition. During these periods of existing unrealistic voltage signals and recovery time therefrom, tracking of the target might be lost and the system would have to go through a search operation again to regain the tracking operation.

In the present invention the radar antenna tracking loop is greatly improved by a means of eliminating all the unrealistic voltage signals which would cause saturation of tracking loop components so that the tracking loop is stabilized for the time duration of any unrealistic voltage and the recovery time is minimized or eliminated entirely. In this invention an integrating network is used for integrating the tracking error signal for application to the servo motor amplifier which in prior known devices has been found to improve the performance of the tracking loop. Further, it is within the contemplation of this invention to couple a limiter network to the integrating circuit to limit the voltage in either polarity of any unrealistic error signal voltage intelligence to a magnitude below that of voltage capable of saturating any of the servo or gyroscope components. In this invention a pair of oppositely poled diodes are coupled in parallel to the integrating circuit, one diode being coupled to a negative biasing voltage and the other diode being coupled to a positive biasing voltage in a manner to eliminate any error voltage intelligence which would be considered unrealistic in the tracking operation of the antenna tracking loop. It is, therefore, a general object of this invention to provide an improved radar antenna target tracking loop with a means for integrating and limiting target tracking voltage intelligence signals to eliminate all spurious and unrealistic error voltage intelligence of an amplitude ordinarily sufficient to saturate the electric components of the tracking loop thereby eliminating the effects of unrealistic signals and recovery periods in which the tracking loop would be out of control as a result of such spurious and unrealistic error voltage intelligence signals.

Figure 2:
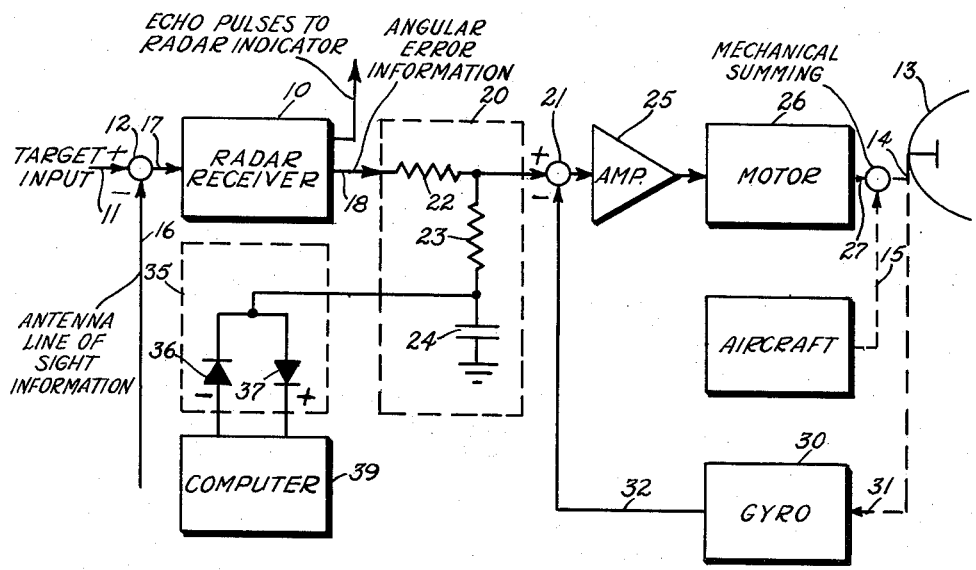

These and other objects, advantages, features, and uses may become more apparent to those skilled in the art of radar target antenna tracking loops as the description progresses when considered in conjunction with the drawing in which:

FIGURE 1 shows a block circuit diagram of a radar target tracking loop incorporating the subject matter of this invention, and FIGURE 2 shows a modification of the block circuit diagram of FIGURE 1 in which the limiter circuit may utilize varying limiter voltages generated by a computer circuit computer from predicted values of the angular velocity of the servo motor system output.

Referring more particularly to FIGURE 1, where a radar antenna target tracking loop is illustrated in block circuit diagram, a radar receiver 10 is shown coupled to receive an error signal input 17 from a summing network 12. The inputs to the summing network 12 consist of the target position information determined by the line of sight to the target 11 and the antenna line of sight 16. The action of this summing point is determined by radar principles well understood by those skilled in the art and forms no part of this invention. The radar antenna 13 is positionable in azimuth and elevation but only the mechanical means for positioning the antenna in azimuth is illustrated herein since the system for elevational positioning is similar. The antenna is supported on a shaft or other means 14 as illustrated herein and its azimuthal position determines the azimuthal antenna line of sight 16 which is one of the signals applied to the summing circuit 12. The line of sight to the target 11 may be considered as a signal of positive polarity which the antenna line of sight 16 will be of a negative polarity the sum of which will be a positive or negative voltage providing the discrimination needed to determine the rotative direction of the antenna as is well understood by those in the radar target tracking art to produce a summed error signal 17 which is applied to the input of radar receiver 10. The target error voltage signal, sometimes referred to as the command rate signal, is transmitted from the output of the radar receiver 10 over the conductor means 18 through an integrating circuit 20 to the summing network 21. The integrating circuit 20 consists of a resistance 22 in series with the conductor 18 and a resistance 23 and capacitor 24 coupled in series between the output end of resistor 22 and ground or fixed potential. The output of the summing network 21 is coupled to a servo amplifier 25 which amplifier drives a servo motor 26. The output shaft 27 of the servo motor 26 drives the antenna 13 in azimuth through its shaft or mechanical means illustrated by 14. Any signals produced by a change in the direction of the line of sight to the target 11 as compared with the antenna line of sight 16 at the summing point 12 will cause the servo motor 26 to drive the antenna 13 (together with elevational drive system, not shown) in a position to focus on the target.

The voltage applied to the servo amplifier 25 is the sum of the target intelligence error signal appearing at the output of network 20 and a voltage produced by a rate gyroscope 30 proportional to the angular rate or angular velocity (with respect to an inertial reference in space) of the antenna shaft 14 by means of a mechanical coupling 31 to the rate gyroscope 30 to shift the body of the rate gyroscope to produce a voltage output on the conductor means 32 to the summing network 21 which voltage is proportional to the sum of the angular velocity or angular rate of the servo motor shaft 27 (with respect to the airframe) and the angular rate of the airframe 15 (with respect to an inertial reference in space) and, consequently, the rate or velocity of the change in angular position of the antenna 13 (with respect to an inertial reference in space). The rate gyroscope 30 serves as an accurate feedback element in the gyroscope stabilization loop and by action of this loop causes the antenna to move at a rate determined by the magnitude of the target intelligence error signal. It should be understood of such rate gyroscope feedback loops that the rate gyroscope is elastically restrained and any change in the gyroscope in its restrained direction by a change in the rate or velocity change of the gyroscope body will cause a voltage change on the output 32 thereof proportional to this rate of change of the rate gyroscope body as is well understood in the art. The negative voltage signal on the output of the rate gyroscope 30 will modify the error tracking voltage signal or command voltage signal in the summing network 21 to cause the servo motor to increase or decrease its angular rate in accordance with the error or command voltage depending on the proximity of the focus of the antenna 13 on the target object.

It may be seen in the above description that any spurious or unrealistic voltages appearing at the output of the radar receiver on conductor 18 as a result of excessive pitch, yaw, or roll motions of the aircraft in which the system is used, from blocking or unblocking of the radar receiver, from purposely generated false signals by the target such as used in electronic counter measures, or for other reasons these spurious or unrealistic voltages may be of sufficient amplitude to saturate the amplifier 25, the servo motor 26, and/or the gyroscope 30, which, during such periods of saturation, would cause the antenna tracking system to go out of control. If an integrating circuit such as 20 were used, such spurious or unrealistic tracking voltage intelligence or command signals would charge the capacitor 24 and the radar target tracking loop would be out of control during the existence of the spurious or unrealistic voltages as well as a recovery time thereafter which would be an allowable time for the capacitor to discharge to realistic voltage values. Such periods of spurious or unrealistic voltage signals and the recovery time therefor may occur for a sufficiently long time for the antenna to lose its target or to cause a lapse in its maneuverability approaching the track of the target. The integrating circuit, while not essential to the antenna target tracking loop, improves the performance thereof by reason of integrating the command signal or error voltage tracking intelligence coming by way of the conductor 18 by increasing the speed of operation of the servo motor amplifier system by wave shaping of these command signals. The voltage across the capacitor 24 is the average of the voltage applied to the servo motor system and therefore corresponds in value to the average velocity of the output shaft 27 of the servo motor system. This average value on capacitor 24 can be changed, therefore, to unrealistic values by the application of spurious or unrealistic voltages applied to the integrating circuit over the conductor 18.

It is a specific purpose of this invention to eliminate all values on the capacitor 24 which would be unrealistic to the proper operation of the target tracking loop whereby any voltages having unrealistic amplitudes, which would saturate the servo amplifier 25, servo motor 26, or gyroscope 30, are eliminated. By this invention the junction of the resistor 23 and the capacitor 24 is coupled in common to the cathode and anode, respectively, of a pair of diodes 36 and 37 in a limiter circuit 35. The anode of the diode 36 is coupled to a negative direct current voltage source and the cathode of the diode 37 is coupled to a direct current positive voltage source. Upon the occurrence of any spurious or unrealistic voltage in the conductor 18 through the resistance 22 to summing network 21 in a positive direction which overcomes the positive bias on the cathode of the diode 37, conduction will be established through the diode 37 to prevent the average value on the capacitor 24 from going above the value of the direct current positive voltage coupled to the cathode of diode 37. In like manner, spurious or unrealistic voltages applied over conductor 18 and resistor 22 would be applied through resistance 23 to the capacitor 24 which would be limited by the diode 36 having a negative bias on the anode thereof to limit the negative voltage on the capacitor 24. By limiting the average value of the voltage on the capacitor 24, the error signal voltage or command voltage will be limited and applied to the summing network 21 and the servo motor system to eliminate any possibility of saturating the servo motor system or its stabilized feedback loop through the gyroscope 30.

*Operation*

In the operation of the antenna target tracking loop as illustrated in FIGURE 1, let it be assumed for the purpose of example following this illustration, that the target tracking loop is for tracking in the azimuthal direction only. The antenna may be in a search condition in which it is rotating to search in the azimuthal direction when a target is illuminated. The target echo information will be received along the line of sight to the target 11 and applied to the summing point 12. The position of the antenna 13 at the time the target is found will determine the antenna line of sight 16 shown as a negative input to the summing point 12 to thereby create an error signal at the radar receiver input 17 which error represents the azimuthal angular difference between the line of sight to the target 11 and the antenna line of sight 16. This error signal is amplified by the radar receiver 10 to produce the receiver output signal 18 which is shaped with a sharp leading edge to immediately set the servo motor amplifier system into operation to direct the antenna toward the sighted target. The antenna 13 is stabilized against the aircraft motion 15 by action of the gyroscope stabilization loop 21, 25, 26, 27, 30, 31, 32, so that the error signal 18 existing at the output of the radar receiver 10 is due primarily to motion of the target. The polarity of the error signal 18 determines the direction of rotation of the servo motor 26 to drive the antenna 13 right or left through the least angular change to focus the antenna 13 on the target although there is relative travel between the antenna 13 and the target in space. The antenna will track the target by reason of the change of target signal information coming by way of the conductor 11 as may be well understood from the prior description.

Referring more particularly to FIGURE 2, where like referenced characters are applied to like parts, the system of FIGURE 1 may be modified to program the limiter circuit 35 to produce varying positive and negative biasing voltages on the diodes 36 and 37, respectively. This means of programming the limiter circuit may be accomplished by the use of a computer 39 of any type well known in the art which may have manual adjustments therein or voltage inputs thereto for generating computed values for the negative and positive voltages applied to the diodes 36 and 37. For example, the computer 39 may be manually adjusted from predicted values of the angular velocity of the servo motor output shaft 27 and consequently, the angular velocity of the antenna by the antenna mechanism 14, to optimise the value of the controlled saturation point where such further control is desirable. While not shown herein the computer 39 could be coupled to the gyroscope output or other points to obtain a voltage signal for computing the limit biasing voltages applied to the diodes 36 and 37.

While many modifications and changes may be made in the constructional details and features of this invention to adapt it for various applications of use, it is to be understood that I desire to be limited only in the scope of the appended claims.

I claim:

1. Means for eliminating saturation voltages from the control circuit of a radar target tracking system comprising:
   a radar receiver for receiving target signals and having an output;
   a radar antenna;
   a servo motor coupled by a coupling circuit to said receiver output and mechanically coupled to said antenna to drive same in accordance with radar error tracking intelligence control voltage from said receiver output over said servo motor coupling circuit;
   a loop coupling said radar antenna to said radar receiver for developing said error tracking intelligence control voltage at the receiver output;
   a gyroscope providing reference voltage coupled to said servo motor coupling circuit for establishing a voltage reference in space and for stabilizing the servo motor antenna driving operation;
   an integrating network in said servo motor coupling circuit including a first resistor in series in said servo motor coupling circuit providing an input and output thereto, and including a second resistor and a capacitor connected in series at the output of said first resistor and ground potential, said capacitor being chargeable to the average value of the amplitude of error tracking intelligence control voltage;
   a limiter network having a pair of diodes with the anode of one and the cathode of the other coupled in common to the juncture of said second resistor and said capacitor in said integrating network; and
   a means supplying a positive biasing voltage to the cathode of said one diode and a negative biasing voltage to the anode of said other diode to establish voltage amplitude limits of the average charge of said error tracking intelligence control voltage on said capacitor in either polarity to maintain said error tracking intelligence control voltage below saturation of said servo motor and related components whereby unrealistic amplitudes of tracking intelligence control voltage is controlled in amplitude to return the radar system to normal operating conditions in minimum time.

2. A circuit as set forth in claim 1 wherein said means supplying said positive and negative biasing voltages is a computer for making computations from predicted values to establish an optimum resultant operation.

References Cited by the Examiner

UNITED STATES PATENTS

| | | | |
|---|---|---|---|
| 2,469,383 | 5/49 | Gibbs et al. | 333—19 |
| 2,858,433 | 10/58 | Rector | 323—9 |
| 2,928,035 | 3/60 | Levinson et al. | 333—28 |
| 2,931,901 | 4/60 | Markusen | 318—18 |
| 3,086,166 | 3/63 | Salvatori | 307—88.5 |

OTHER REFERENCES

QST for December 1946, page 4, the circuit thereon.

CHESTER L. JUSTUS, *Primary Examiner*.